(12) United States Patent
Zucca

(10) Patent No.: US 10,757,175 B2
(45) Date of Patent: Aug. 25, 2020

(54) SYNCHRONIZATION OPTIMIZATION BASED UPON ALLOCATION DATA

(71) Applicant: VMware, Inc., Palo Alto, CA (US)

(72) Inventor: Michael Zucca, Somerville, MA (US)

(73) Assignee: VMware, Inc., Palo Alto, CA (US)

(*) Notice: Subject to any disclaimer, the term of this patent is extended or adjusted under 35 U.S.C. 154(b) by 760 days.

(21) Appl. No.: 14/618,914

(22) Filed: Feb. 10, 2015

(65) Prior Publication Data

US 2016/0234296 A1 Aug. 11, 2016

(51) Int. Cl.
*H04L 29/08* (2006.01)
*H04L 29/06* (2006.01)

(52) U.S. Cl.
CPC ...... *H04L 67/1008* (2013.01); *H04L 67/1097* (2013.01); *H04L 67/38* (2013.01)

(58) Field of Classification Search
CPC .. H04L 67/1008; H04L 67/38; H04L 67/1097
See application file for complete search history.

(56) References Cited

U.S. PATENT DOCUMENTS

| | | | | |
|---|---|---|---|---|
| 5,521,602 A * | 5/1996 | Carroll | ........ | G06K 7/0008 340/10.41 |
| 5,710,881 A * | 1/1998 | Gupta | ........ | G06F 12/0804 345/541 |
| 7,146,475 B2 * | 12/2006 | Perego | ........ | G06F 3/0607 711/162 |
| 8,447,941 B2 * | 5/2013 | Kono | ........ | G06F 3/0605 707/827 |
| 8,732,364 B1 * | 5/2014 | LeCrone | ........ | G06F 3/0605 710/15 |
| 2002/0144076 A1 * | 10/2002 | Yamamoto | ........ | G06F 3/0617 711/202 |
| 2002/0196744 A1 * | 12/2002 | O'Connor | ........ | H04L 29/06 370/254 |
| 2003/0101318 A1 * | 5/2003 | Kaga | ........ | G06F 11/2082 711/114 |

(Continued)

OTHER PUBLICATIONS

Werneburg, Introduction to VMware vSphere Replication, Simple and Effective Virtual Machine Protection, Technical White Paper, VMware, Inc., Copyright 2012, 10 pages.

*Primary Examiner* — Brian J. Gillis
*Assistant Examiner* — Javier O Guzman
(74) *Attorney, Agent, or Firm* — Fish & Richardson P.C.

(57) ABSTRACT

Exemplary methods, apparatuses, and systems transmit a request to a destination site for information indicating whether or not each of a plurality of regions of a destination logical storage device is allocated. Each of the corresponding regions of a source logical storage device is determined to be either allocated or unallocated. The allocation information is received from the destination site. The allocation status of a first region of the plurality of regions of the source logical storage device and of a corresponding first region of the plurality of regions of the destination logical storage device is determined. The first region of the source logical storage device and the corresponding first region of the destination logical storage device are synchronized based upon the determined allocation status of the first region of the source logical storage device and determined allocation status of the corresponding first region of the destination logical storage.

20 Claims, 3 Drawing Sheets

(56) References Cited

U.S. PATENT DOCUMENTS

| | | | | |
|---|---|---|---|---|
| 2003/0187847 A1* | 10/2003 | Lubbers | ............... | G06F 11/2082 |
| 2003/0187947 A1* | 10/2003 | Lubbers | ............... | G06F 11/2058 |
| | | | | 709/217 |
| 2003/0237019 A1* | 12/2003 | Kleiman | ............ | G06F 11/1092 |
| | | | | 714/6.32 |
| 2005/0257014 A1* | 11/2005 | Maki | ..................... | G06F 3/0605 |
| | | | | 711/162 |
| 2007/0022263 A1* | 1/2007 | Fandel | ................ | G06F 11/2074 |
| | | | | 711/162 |
| 2007/0245116 A1* | 10/2007 | Yamamoto | ............ | G06F 3/0608 |
| | | | | 711/172 |
| 2007/0286049 A1* | 12/2007 | Sasaki | .................... | G11B 31/02 |
| | | | | 369/84 |
| 2007/0294314 A1* | 12/2007 | Padovano | ........... | G06F 11/2079 |
| 2009/0254695 A1* | 10/2009 | Deguchi | ................ | G06F 3/061 |
| | | | | 711/100 |
| 2010/0174880 A1* | 7/2010 | McAllister | ........... | G06F 3/0607 |
| | | | | 711/162 |
| 2010/0191757 A1* | 7/2010 | Noguchi | .............. | G06F 3/0608 |
| | | | | 707/758 |
| 2010/0211737 A1* | 8/2010 | Flynn | .................... | G06F 3/0616 |
| | | | | 711/114 |
| 2011/0010496 A1* | 1/2011 | Kirstenpfad | ...... | G06F 17/30067 |
| | | | | 711/114 |
| 2012/0124309 A1* | 5/2012 | Watanabe | ............. | G06F 3/0607 |
| | | | | 711/162 |
| 2013/0060989 A1* | 3/2013 | Aune | .................. | G06F 12/0246 |
| | | | | 711/103 |
| 2013/0132699 A1* | 5/2013 | Vaishampayan | ...... | G06F 11/073 |
| | | | | 711/170 |
| 2013/0325824 A1* | 12/2013 | Shoens | .................. | G06F 16/16 |
| | | | | 707/698 |
| 2015/0169225 A1* | 6/2015 | Curley | .................. | G06F 3/0619 |
| | | | | 711/162 |

* cited by examiner

… (1)

SYNCHRONIZATION OPTIMIZATION BASED UPON ALLOCATION DATA

FIELD OF THE INVENTION

The various embodiments described in this document relate to replicating one or more virtual machines and/or other workloads, e.g., from one data center to another. In particular, the embodiments relate to utilizing storage allocation data to determine whether or not to read and checksum or otherwise compare the data of corresponding regions of the source and destination storage during synchronization.

BACKGROUND OF THE INVENTION

Disaster recovery is an availability solution for recovering all or a portion of a datacenter at a recovery site from replicated data. For example, a virtual machine (VIVI) or logical storage device within a source datacenter site may be configured for replication to a destination datacenter site. When a VM is initially configured for replication, a replication process performs a full synchronization operation. During the full synchronization, the replication process copies all of the data from the source VM to the destination site. If, however, the source VM is large or if the bandwidth of the network connection between the source and destination is low, the initial full synchronization might take a long time. As a result, an administrator may choose to create a seed copy of the VM at the destination site. For example, the administrator may clone or otherwise export a copy of the source virtual machine to a removable storage medium, which is physically transported to the destination site to seed the replication at the destination site. When a replication is configured using a seed copy, the replication process does not simply copy all of the data from the source VM to the destination site during the initial full synchronization. Instead, the replication process performs the full synchronization by comparing the source and destination copies of the data. For example, this comparison may include each of a source site and destination site reading and generating checksums of corresponding portions of storage within the source site and the destination site, respectively. The destination site transmits its checksums to the source site. The source site compares the checksums to determine if any of the checksums from the destination site do not match the corresponding checksums from the source site, e.g., due to changes that occurred subsequent to making the initial copy. When a checksum does not match, the source site reads and transmits, to the destination site, the data from the portion of storage that lacks a matching checksum. The destination site receives and writes the data to the destination storage to bring the destination site into synchronization with the source site.

Additionally, other replication configurations may result in synchronization between the source and destination. For example, when reversing the direction of protection, a replication process may use an original source copy of a VM (that is becoming the destination copy) as a seed.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

As physical storage devices increase in size and decrease in price, users are creating VMs with larger logical storage devices (e.g., virtual disks). This may be the case even when the logical storage device does not consume much of the actual physical storage device. Simply reading these large logical storage devices, even before performing the checksum, can consume a considerable amount of time. Additionally, long latencies between sites over a wide area network (WAN) can result in significant delays, even for small transactions like batched checksum requests. For example, a full synchronization of a 62 terabyte virtual disk can take weeks to perform. This lengthy full synchronization may be performed even when a significant portion of the logical storage device has not been allocated. As a result, several days of synchronization may be consumed in reading and generating a checksum for regions of a large logical storage device that are mostly empty.

This document describes embodiments that utilize allocation data to optimize the synchronization of logical storage devices. For example, embodiments skip reading and generating a checksum (or other representative value) for unallocated regions. In particular, when corresponding regions of source and destination logical storage devices are both unallocated, embodiments designate those regions as being synchronized or otherwise forgo reading and generating a checksum for those regions. When the source region is allocated and the corresponding destination region is unallocated, embodiments may only read and generate a checksum for the source region. A predetermined checksum for an unallocated region may be used to represent the destination region rather than reading and generating a checksum for the unallocated destination region. When the source region is unallocated and the corresponding destination region is allocated, embodiments transmit a request to delete the data within the allocated destination region. For example, embodiments may transmit a deallocation request to the destination site. As a result, embodiments conserve time, networking, and processing resources by avoiding additional read requests and checksum computations.

Figure 1:
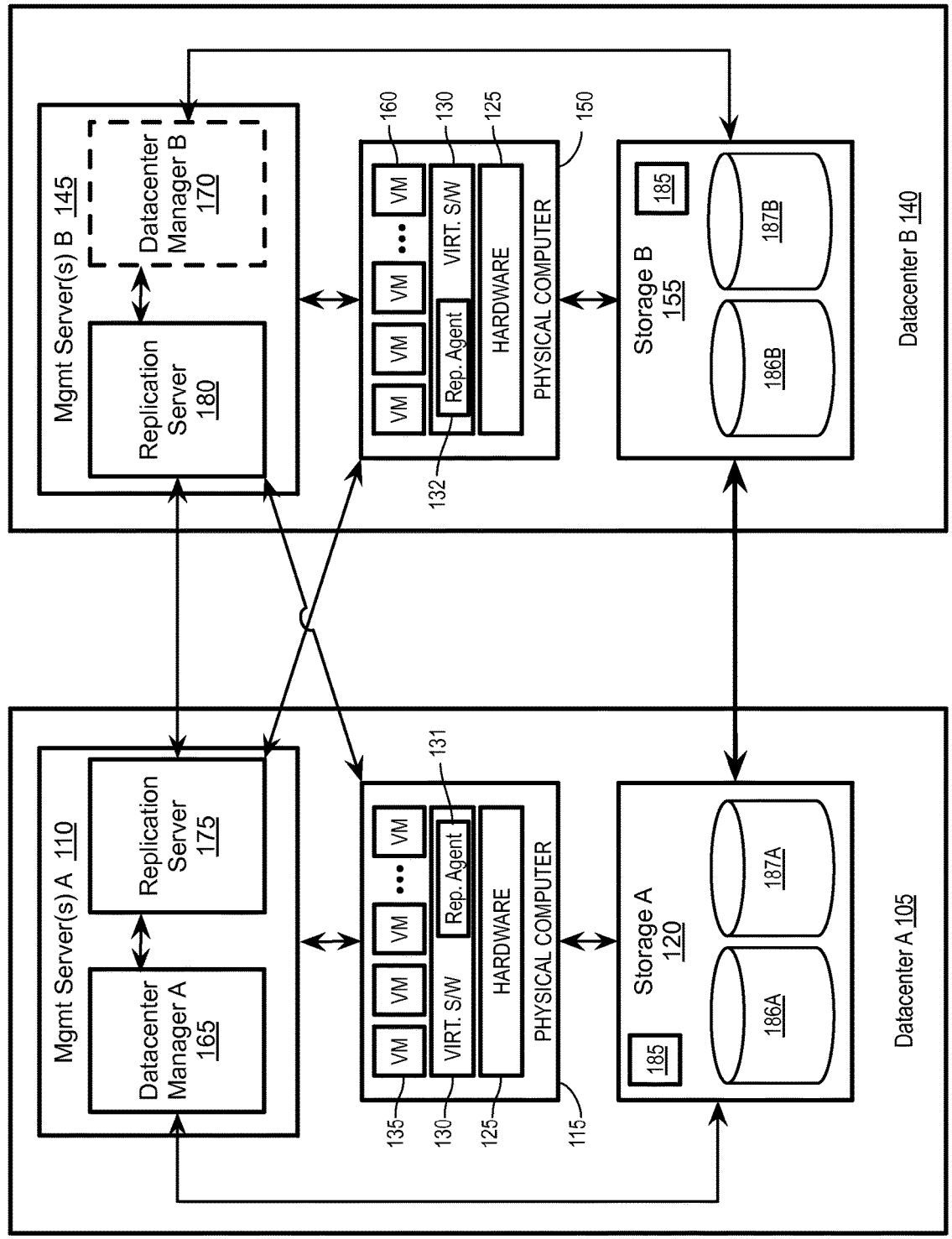
FIG. 1 illustrates, in block diagram form, exemplary virtual data centers configured to optimize the synchronization of logical storage devices based upon allocation data.

FIG. 1 illustrates, in block diagram form, exemplary virtual data centers configured to optimize the synchronization of logical storage devices based upon allocation data. Datacenter A 105 includes management server(s) A 110, one or more host devices 115, and storage A 120. Each host device 115 includes hardware 125, virtualization software layer 130 (also referred to as a hypervisor), and virtual machines (VMs) 135. Similarly, datacenter B 140 includes management server(s) B 145, one or more host devices 150, and storage B 155. Each host device 150 includes hardware 125, virtualization software layer 130, and VMs 160. In one embodiment, datacenter A 105 represents a first datacenter site and datacenter B represents a second, geographically distinct datacenter site.

Each of storage A 120 and storage B 155 includes one or more physical storage devices. In one embodiment, storage A 120 and storage B 155 are storage arrays and include storage controllers 185 to serve read and write requests and management commands/queries from host devices 115/150 and management servers 110/145. Each of storage A 120 and storage B 155 is partitioned into logical units, volumes, virtual volumes, disks and/or virtual disks (which are collectively referred to in this document as logical storage devices) that are stored on one or more of the physical storage devices. For example, storage A 120 is illustrated as including logical storage devices 186A and 187A and storage B 155 is illustrated as including logical storage devices 186B and 187B. Each of storage A 120 and storage B 155 may include additional arrays, logical storage devices, or other partitions of storage.

In one embodiment, a portion of storage A 120 is configured for replication of, e.g., logical storage device 187A, to an array or a subdivision of storage B 155, e.g., logical storage device 187B. As used in this document, replication provides a redundant copy of a logical storage device within the destination datacenter, e.g., which is brought online when the associated source storage device within the protected datacenter fails. For example, the active instance, storage device 187A, may be available for read and write commands from one or more VMs 135 in host device(s) 115. The passive instance, storage device 187B, is a copy of storage device 187A and not available for read and write commands from any VMs 135/160 or hosts device(s) 115/150 in order to prevent corruption of the replicated data.

VMs 135/160 are complete computation environments, containing virtual equivalents of the hardware and system software components of a physical system and are typically implemented by an extensive virtualization infrastructure, which includes a variety of software and hardware components. For example, one or more of the VMs may implement virtual desktops. A virtual desktop is a virtual computing system that operates as a desktop or workstation computer with which an end user can interact using a desktop remoting protocol over a network. In one embodiment, one or more of the VMs implement a virtualized compute, networking, storage, or security service (e.g., a firewall, webserver, database server, etc.).

Virtualization software layer 130 runs on hardware 125 of host device (e.g., a physical computer) 115/150. Virtualization software layer 130 manages one or more VMs and physical resources, e.g., hardware 125. Additionally, virtualization software layer 130 maintains virtual-to-physical hardware mappings. For example, virtualization software 130 may manage VM access to a processor, memory, or network interface within hardware 125 as well as a virtual disk for each VM within underlying storage 120/155.

Virtualization software layer 130 within host 115 includes replication agent 131 and virtualization software layer 130 within host 150 includes replication agent 132. Replication agents determine which data in a source logical storage device is to be copied to the destination site. For example, during synchronization, replication agent 131 may compare the data stored in logical storage device 186A with data stored in logical storage device 186B to determine which data needs to be copied from logical storage device 186A to logical storage device 186B to synchronize the logical storage devices for replication. In one embodiment, the comparison of data stored in the logical storage devices includes replication agent 131 reading and generating a checksum for each region of logical storage device 186A and requesting corresponding checksums for each region of logical storage device 186B from datacenter B 140. Replication agent 131 compares the checksums to determine which data locations within logical storage device 186A differ from corresponding data locations within logical storage device 186B. Once replication agent 131 determines which data is unique to logical storage device 186A, replication agent 131 transmits copes of the unique data to datacenter B 140.

As described further in this document, replication agent 131 may also utilize allocation data to determine whether or not to compare the data stored in the respective logical storage devices, to apply a predetermined checksum representing an unallocated region, to transmit a deallocation request, etc. Additionally, replication agents identify unique writes made by protected VMs to underlying storage. For example, once replication is configured and logical storage device 186A is synchronized with logical storage device 186B, replication agent 131 identifies unique writes made by a VM 135 to logical storage device 186A and transmits copies of those writes to datacenter B 140.

Management server(s) A 110 include replication server 175 and management server(s) B 145 include replication server 180. The replication servers provide the management framework for replication. For example, replication server 175 enables replication of one or more VMs 135 between datacenter sites by configuring replication agent 131 to synchronize corresponding logical storage devices between source datacenter A 105 and destination datacenter B 140 and to mirror writes from VM(s) 135 to destination datacenter B 140. In one embodiment, the configuration of replication includes a region size for the underlying storage devices for comparison during synchronization. For example, the replication servers may divide logical storage devices into evenly sized extents (e.g., of 8 kilobytes) and define regions as sets of contiguous extents (e.g., 256 contiguous extents).

In one embodiment, the replication servers receive requests for comparisons (e.g., requests for region checksums) and replicated data transmitted from the other datacenter site. For example, replication server 180 receives a request from replication agent 131 for checksums for each region of logical storage device 186B. In another embodiment, replication server 180 requests that replication agent 132 read each region of logical storage device 186B and generate the corresponding checksums. Additionally, replication server 180 receives replicated data transmitted from replication agent 131. Replication server 180 writes the received data to underlying storage B 155. For example, replication server 180 utilizes network file copy (NFC) or another protocol to write data received from replication agent 131 to logical storage device 186B.

Management server(s) A 110 further include datacenter manager A 165. In one embodiment, datacenter manager A 165 provides a management console for manual and automated control of hosts 115, VMs 135, and storage A 120. Similarly, management server(s) B 145 optionally include datacenter manager B 170 to provide a management console for manual and automated control of hosts 150, VMs 160, and storage B 155. Alternatively, datacenter manager A 165 provides a management console for both datacenter A 105 and datacenter B 140. For example, datacenter manager A 165 (and optionally datacenter manager B 170) provision, configure, and maintain VMs as virtual desktops or network services; manage pools of computer resources to run the VMs; etc.

Components of datacenter A 105 are illustrated as being coupled to components of datacenter B 140. While various components are illustrated as being directly coupled for the ease of explanation, a network including one or more switches or routers may lie between datacenter A 105 and datacenter B 140 and facilitate the coupling of the various components. For example, datacenter A 105 and datacenter B 140 may be coupled via a WAN.

Figure 2:
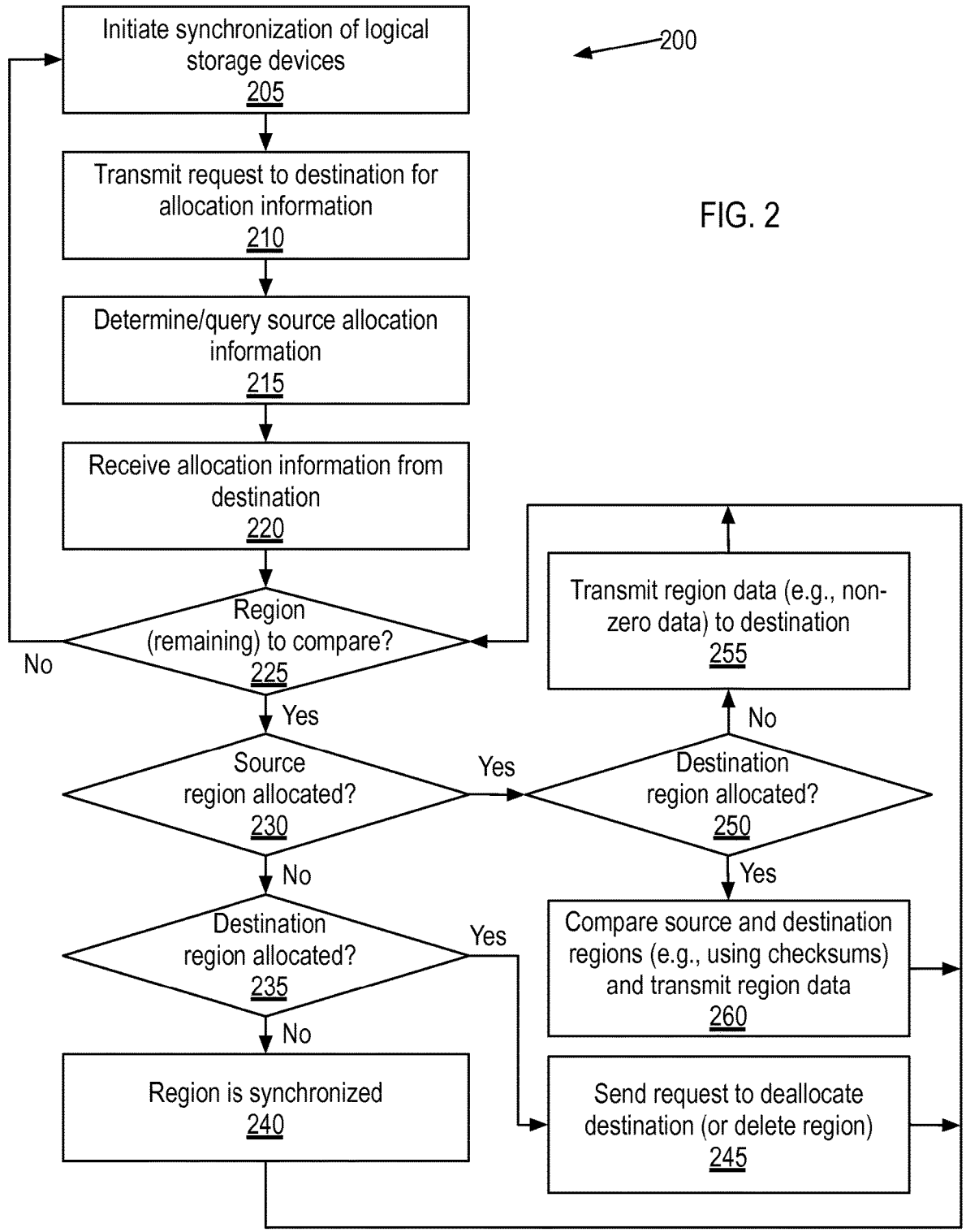
FIG. 2 is a flow chart illustrating an exemplary method of utilizing allocation data to optimize the synchronization of logical storage devices.

FIG. 2 is a flow chart illustrating exemplary method 200 of utilizing allocation data to optimize the synchronization of logical storage devices. At block 205, a replication agent initiates the synchronization of a source logical storage device and a destination logical storage device. In one embodiment, the replication agent detects an event to trigger the synchronization or otherwise determines based upon synchronization settings to initiate the synchronization. For example, the initial configuration of a VM for replication may include a determination of and/or indication of the logical storage device associated with the VM, referred to in this document as the source logical storage device. Additionally, the configuration may indicate a destination logical storage device to receive replicated data. In response to the initial configuration, the replication agent initiates a full synchronization of the source and destination logical storage devices. As another example, a reprotect command (e.g., to change roles of source/protected logical storage device and destination/recovery logical storage device), moving the source or destination logical storage device, or another event triggers the synchronization.

At block 210, in response to initiating the synchronization, the replication agent transmits a request to the destination site for storage allocation information for the destination logical storage device. For example, replication agent 131 transmits a request to replication server 180 identifying the VM 135, source logical storage device 186A, or destination logical storage 186B.

At block 215, further in response to initiating the synchronization, the replication agent queries or otherwise determines allocation information for the source logical storage device. For example, while waiting for the destination site to respond with allocation information for destination logical storage device 186B, replication agent 131 queries underlying storage A 120 for allocation information for source logical storage device 186A. Storage A 120 presents replication agent 131 with allocation data indicating whether each region of logical storage device 186A is allocated or unallocated.

At block 220, the replication agent receives the allocation information for destination logical storage device 186B. For example, replication server 180 or replication agent 132 queries underlying storage B 155 for allocation information for source logical storage device 186B. Storage B 155 presents replication server 180 or replication agent 132 with allocation data indicating whether each region of logical storage device 186B is allocated or unallocated. Replication server 180 transmits the allocation data to replication agent 131.

At block 225, the replication agent determines if there are any corresponding regions of the logical storage devices (remaining) to compare. As described above, replication configuration settings may utilize regions of a predetermined size to evaluate corresponding portions of logical storage devices. At the initiation of the comparison, there will be a plurality of regions to compare.

If there are any corresponding regions of the logical storage devices to be compared, at block 230, the replication agent determines if a current region of the source logical storage device has been allocated. If the current region of the source logical storage device has not been allocated, at block 235, the replication agent determines if the corresponding region of the destination logical storage device has been allocated. If the current region of the source logical storage device and the corresponding region of the destination logical storage device are both unallocated, at block 240, the replication agent designates the regions as being synchronized, forgoes further comparison of the regions, and method 200 returns to block 225 to compare any remaining regions.

If the current region of the source logical storage device has not been allocated but the corresponding region of the destination logical storage device has been allocated, at block 245, the replication agent sends a request to the destination site to deallocate or otherwise delete the data within the corresponding region of the destination logical storage device and method 200 returns to block 225 to compare any remaining regions. For example, replication agent 131 may transmit a request to replication server 180 to issue a TRIM, UNMAP, or other deallocation command for the corresponding region of destination logical storage device 186B. Alternatively, replication agent 131 transmits data equivalent to the unallocated region to replication server 180 to overwrite or otherwise delete the data in allocated destination logical storage device 186B. For example, replication agent 131 may transmit zeroes to overwrite the data in allocated destination logical storage device 186B. In one embodiment, the replication agent determines which locations within allocated destination logical storage device are to be overwritten/deleted. For example, replication agent 131 may request and receive a checksum for allocated destination logical storage device 186B. Replication agent 131 compares the received checksum against a predetermined checksum for an unallocated region (rather than reading and computing a checksum for the current region of source logical storage device 186A, which has already been determined to be unallocated). Based upon the comparison, replication agent 131 transmits zeroes to overwrite only those locations within allocated destination logical storage device 186B that currently store non-zero values. While embodiments are described within this document as utilizing checksums, alternative embodiments utilize a different representative value. For example, embodiments may utilize a checksum, a hash, a fingerprint, or other value that sufficiently represents the contents of a region of a logical storage device for comparison with a corresponding representative value of another region of storage to determine if the regions are synchronized or to determine which portions of the regions are/are not synchronized.

If the current region of the source logical storage device has been allocated, at block 250, the replication agent determines if the corresponding region of the destination logical storage device has been allocated. If the current region of the source logical storage device has been allocated but the corresponding region of the destination logical storage device has not been allocated, at block 245, the replication agent transmits data from the current region of the source logical storage device to the destination site and method 200 returns to block 225 to compare any remaining regions. In one embodiment, the replication agent only transmits non-zero portions of data from the current region of the source logical storage device to the destination site. For example, replication agent 131 reads the allocated region of source logical storage device 186A and generates a checksum for that region. Replication agent 131 compares the generated checksum against a predetermined checksum for an unallocated region (rather than requesting the destination site read and generate a checksum for the corresponding region of destination logical storage device 186B, which has already been determined to be unallocated). Based upon the comparison, replication agent 131 transmits non-zero portions of data to overwrite only those locations within allocated destination logical storage device 186B that are to include the non-zero values.

If the current region of the source logical storage device and the corresponding region of the destination logical storage device both have been allocated, at block 260, the replication agent compares the data written to source and destination regions and method 200 returns to block 225 to compare any remaining regions. For example, replication agent 131 reads and generates a checksum for the current region of logical storage device 186A. Replication agent 131 requests and receives a checksum for the corresponding region of logical storage device 186B from datacenter B 140. Replication agent 131 compares the checksums to determine which data locations within logical storage device 186A differ from corresponding data locations within logical storage device 186B. Once replication agent 131 determines which data is unique to logical storage device 186A, replication agent 131 transmits copes of the unique data to datacenter B 140.

If there are no remaining corresponding regions of the logical storage devices to be compared (e.g., upon reaching the end of the logical storage device), method 200 returns to block 205 to await the next synchronization. Alternatively, method 200 simply terminates when there are no remaining corresponding regions of the logical storage devices to be compared.

As a result, the replication agent is able eliminate a number of reads, computations of checksums, comparisons of checksums, and writes during the synchronization by utilizing allocation information.

Figure 3:
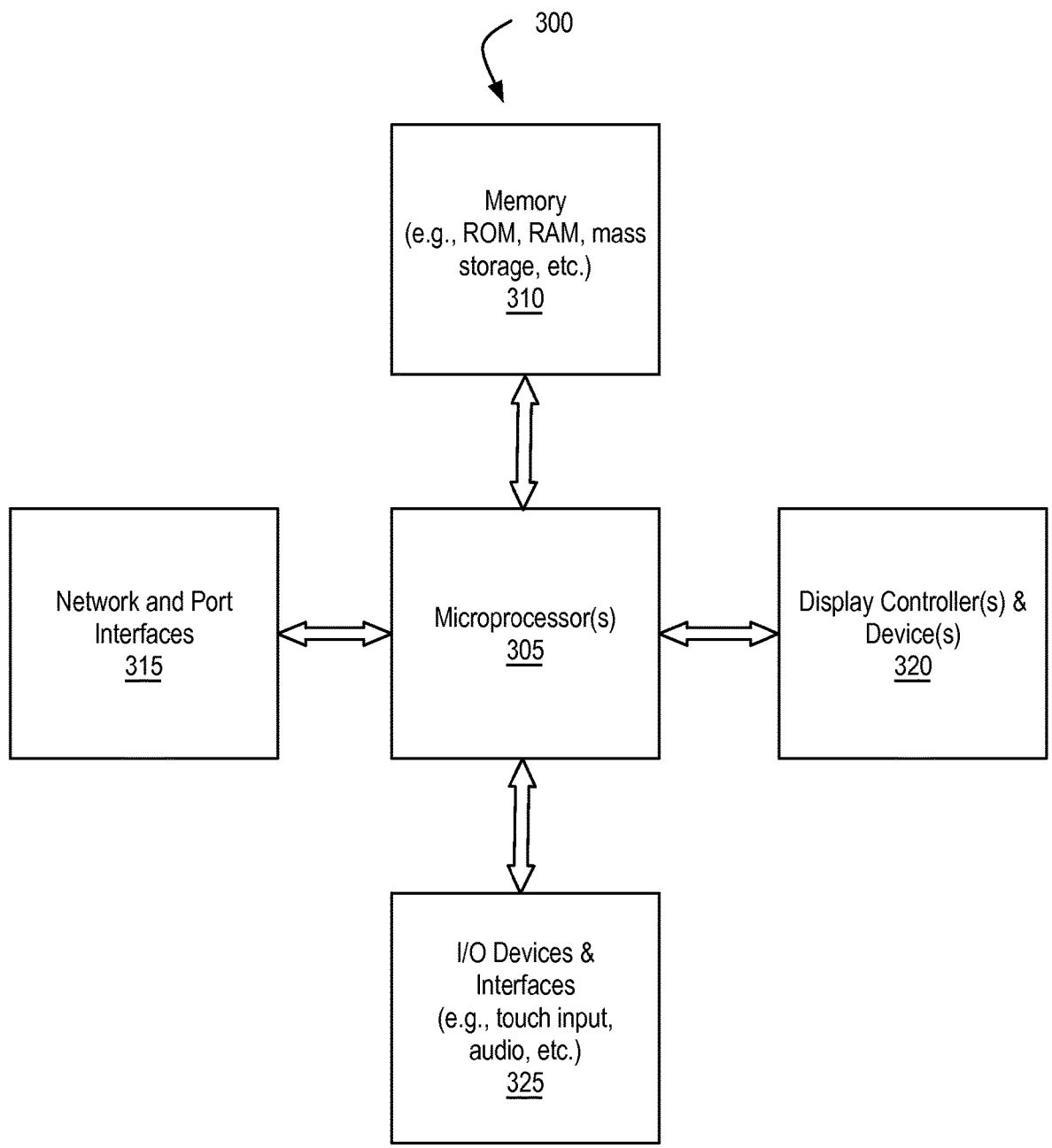
FIG. 3 illustrates, in block diagram form, an exemplary processing system to utilize allocation data to optimize the synchronization of logical storage devices.

FIG. 3 illustrates, in block diagram form, exemplary processing system 300 to utilize allocation data to optimize the synchronization of logical storage devices. Data processing system 300 includes one or more microprocessors 305 and connected system components (e.g., multiple connected chips). Alternatively, data processing system 300 is a system on a chip.

Data processing system 300 includes memory 310, which is coupled to microprocessor(s) 305. Memory 310 may be used for storing data, metadata, and programs for execution by the microprocessor(s) 305. Memory 310 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 310 may be internal or distributed memory.

Data processing system 300 includes network and port interfaces 315, such as a port, connector for a dock, or a connector for a USB interface, FireWire, Thunderbolt, Ethernet, Fibre Channel, etc. to connect the system 300 with another device, external component, or a network. Exemplary network and port interfaces 315 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 300 with another device, external component, or a network and receive stored instructions, data, tokens, etc.

Data processing system 300 also includes display controller and display device 320 and one or more input or output ("I/O") devices and interfaces 325. Display controller and display device 320 provides a visual user interface for the user. I/O devices 325 allow a user to provide input to, receive output from, and otherwise transfer data to and from the system. I/O devices 325 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 3.

Data processing system 300 is an exemplary representation of one or more of management server(s) 110, management server(s) 145, host device(s) 115, host devices 150, storage device(s) 120, and storage device(s) 155 described above. Data processing system 300 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 300 may be a network computer, server, or an embedded processing device within another device or consumer electronic product. As used in this document, the terms computer, device, system, processing system, processing device, and "apparatus comprising a processing device" may be used interchangeably with data processing system 300 and include the above-listed exemplary embodiments.

It will be appreciated that additional components, not shown, may also be part of data processing system 300, and, in certain embodiments, fewer components than that shown in FIG. 3 may also be used in data processing system 300. It will be apparent from this description that aspects of the inventions may be embodied, at least in part, in software. That is, the computer-implemented method 200 may be carried out in a computer system or other data processing system 300 in response to its processor or processing system 305 executing sequences of instructions contained in a memory, such as memory 310 or other non-transitory machine-readable storage medium. The software may further be transmitted or received over a network (not shown) via network interface device 315. In various embodiments, hardwired circuitry may be used in combination with the software instructions to implement the present embodiments. Thus, the techniques are not limited to any specific combination of hardware circuitry and software, or to any particular source for the instructions executed by data processing system 300.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention (s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used in this document to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
    transmitting a request to a destination site for allocation information indicating whether or not each of a plurality of regions of a destination logical storage device is allocated;
    determining whether or not each of a plurality of corresponding regions of a source logical storage device is allocated;
    receiving the requested allocation information from the destination site;
    determining an allocation status of a first region of the plurality of regions of the source logical storage device and an allocation status of a corresponding first region of the plurality of regions of the destination logical storage device;
    and optimizing a synchronization process between the first region of the source logical storage device and the corresponding first region of the destination logical storage device based upon the determined allocation status of the first region of the source logical storage device and the determined allocation status of the corresponding first region of the destination logical storage device including, when one of the first region of the source or the destination logical storage device is determined to be unallocated based on the determined allocation status, comparing a checksum generated for a corresponding other one of the first region of the source or destination logical storage device that is determined to be allocated based on the determined allocation status against a predetermined checksum representing an unallocated region rather than reading and generating checksum for the first region of the source or flame destination logical storage device that is determined to be unallocated.

2. The computer-implemented method of claim 1, wherein optimizing the synchronization process between the synchronizing a second region of the source logical storage device and a corresponding second region of the destination logical storage device includes designating the second region of the source logical storage device and the corresponding second region of the destination logical storage device as being synchronized in response to a determination that both second regions are unallocated.

3. The computer-implemented method of claim 2, wherein designating the second region of the source logical storage device and the corresponding second region of the destination logical storage device as being synchronized includes omitting the second region of the source logical storage device and the corresponding second region of the destination logical storage device from further comparison during a full synchronization.

4. The computer-implemented method of claim 1, wherein optimizing the synchronization process between the first region of the source logical storage device and the corresponding first region of the destination logical storage device comprises:
  determining the first region of the source logical storage device is allocated and the corresponding first region of the destination logical storage device is unallocated; and
  transmitting data from the first region of the source logical storage device to the destination site in response to determining the first region of the source logical storage device is allocated and the corresponding first region of the destination logical storage device is unallocated.

5. The computer-implemented method of claim 4, wherein transmitting data from the first region of the source logical storage device to the destination site comprises:
  generating a value representing the first region of the source logical storage device;
  comparing the value representing the first region of the source logical storage device to a predetermined value representing an unallocated region;
  determining which data of the first region of the source logical storage device to transmit to the destination site based upon the comparison of the value representing the first region of the source logical storage device and the predetermined value; and
  transmitting the determined data of the first region of the source logical storage device to the destination site.

6. The computer-implemented method of claim 1, wherein optimizing the synchronization process between the first region of the source logical storage device and the corresponding first region of the destination logical storage device comprises:
  determining the first region of the source logical storage device is unallocated and the corresponding first region of the destination logical storage device is allocated; and
  transmitting a request to the destination site to delete the data within the first region of the destination logical storage device in response to determining the first region of the source logical storage device is unallocated and the corresponding first region of the destination logical storage device is allocated.

7. The computer-implemented method of claim 6, wherein transmitting the request to the destination site to delete the data within the first region of the destination logical storage device comprises transmitting a request to deallocate the first region of the destination logical storage device.

8. The computer-implemented method of claim 6, wherein transmitting the request to the destination site to delete the data within the first region of the destination logical storage device comprises:
  transmitting a request to the destination site for a value representing the first region of the destination logical storage device;
  receiving the value representing the first region of the destination logical storage device from the destination site;
  comparing the value representing the first region of the destination logical storage device to a predetermined value representing an unallocated region;
  determining which data locations of the first region of the destination logical storage device to delete based upon a comparison of the value representing the first region of the destination logical storage device and the predetermined value; and
  transmitting a request to delete the determined data locations.

9. The computer-implemented method of claim 1, wherein optimizing the synchronization process further comprises:
  determining that a second region of the source logical storage device is allocated and a corresponding second region of the destination logical storage device is allocated;
  transmitting a request to the destination site for a value representing the second region of the destination logical storage device;
  generating a value representing the second region of the source logical storage device;
  receiving the value representing the second region of the destination logical storage device from the destination site;
  comparing the value representing the second region of the source logical storage device to the value representing the second region of the destination logical storage device;
  determining which data of the second region of the source logical storage device to transmit to the destination site based upon the comparison of the value representing the second region of the source logical storage device and the value representing the second region of the destination logical storage device; and
  transmitting the determined data of the second region of the source logical storage device to the destination site.

10. A non-transitory computer-readable medium storing instructions, which when executed by a processing device, cause the processing device to perform a method comprising:
  transmitting a request to a destination site for allocation information indicating whether or not each of a plurality of regions of a destination logical storage device is allocated;
  determining whether or not each of a plurality of corresponding regions of a source logical storage device is allocated;
  receiving the requested allocation information from the destination site;
  determining an allocation status of a first region of the plurality of regions of the source logical storage device and an allocation status of a corresponding first region of the plurality of regions of the destination logical storage device;
  and optimizing a synchronization process between the first region of the source logical storage device and the corresponding First region of the destination logical storage device based upon the determined allocation status of the first region of the source logical storage device and the determined allocation status of the corresponding first region of the destination logical storage device including, when one of the first region of the source or the destination logical storage device is determined to be unallocated based on the determined allocation status, comparing a checksum generated for a corresponding other one of the first region of the source or destination logical storage device that is determined to be allocated based on the determined allocation status against a predetermined checksum representing an unallocated region rather than reading and generating checksum for the first region of the source or the destination logical storage device that is determined to be unallocated.

11. The non-transitory computer-readable medium of claim 10, wherein optimizing the synchronization process between a second region of the source logical storage device and a corresponding second region of the destination logical storage device includes designating the second region of the source logical storage device and the corresponding second region of the destination logical storage device as being synchronized in response to a determination that both second regions are unallocated.

12. The non-transitory computer-readable medium of claim 11, wherein designating the second region of the source logical storage device and the corresponding second region of the destination logical storage device as being synchronized includes omitting the second region of the source logical storage device and the corresponding second region of the destination logical storage device from further comparison during a full synchronization.

13. The non-transitory computer-readable medium of claim 10, wherein optimizing the synchronization process between the first region of the source logical storage device and the corresponding first region of the destination logical storage device comprises:
   determining the first region of the source logical storage device is allocated and the corresponding first region of the destination logical storage device is unallocated; and
   transmitting data from the first region of the source logical storage device to the destination site in response to determining the first region of the source logical storage device is allocated and the corresponding first region of the destination logical storage device is unallocated.

14. The non-transitory computer-readable medium of claim 13, wherein transmitting data from the first region of the source logical storage device to the destination site comprises:
   generating a value representing the first region of the source logical storage device;
   comparing the value representing the first region of the source logical storage device to a predetermined value representing an unallocated region;
   determining which data of the first region of the source logical storage device to transmit to the destination site based upon the comparison of the value representing the first region of the source logical storage device and the predetermined value; and
   transmitting the determined data of the first region of the source logical storage device to the destination site.

15. The non-transitory computer-readable medium of claim 10, wherein optimizing the synchronization process between the first region of the source logical storage device and the corresponding first region of the destination logical storage device comprises:
   determining the first region of the source logical storage device is unallocated and the corresponding first region of the destination logical storage device is allocated; and
   transmitting a request to the destination site to delete the data within the first region of the destination logical storage device in response to determining the first region of the source logical storage device is unallocated and the corresponding first region of the destination logical storage device is allocated.

16. The non-transitory computer-readable medium of claim 15, wherein transmitting the request to the destination site to delete the data within the first region of the destination logical storage device comprises transmitting a request to deallocate the first region of the destination logical storage device.

17. The non-transitory computer-readable medium of claim 15, wherein transmitting the request to the destination site to delete the data within the first region of the destination logical storage device comprises:
   transmitting a request to the destination site for a value representing the first region of the destination logical storage device;
   receiving the value representing the first region of the destination logical storage device from the destination site;
   comparing the value representing the first region of the destination logical storage device to a predetermined value representing an unallocated region;
   determining which data locations of the first region of the destination logical storage device to delete based upon a comparison of the value representing the first region of the destination logical storage device and the predetermined value; and
   transmitting a request to delete the determined data locations.

18. The non-transitory computer-readable medium of claim 10, wherein optimizing the synchronization process further comprises:
   determining that a second region of the source logical storage device is allocated and a corresponding second region of the destination logical storage device is allocated;
   transmitting a request to the destination site for a value representing the second region of the destination logical storage device;
   generating a value representing the second region of the source logical storage device;
   receiving the value representing the second region of the destination logical storage device from the destination site;
   comparing the value representing the second region of the source logical storage device to the value representing the second region of the destination logical storage device;
   determining which data of the second region of the source logical storage device to transmit to the destination site based upon the comparison of the value representing the second region of the source logical storage device and the value representing the second region of the destination logical storage device; and
   transmitting the determined data of the second region of the source logical storage device to the destination site.

19. An apparatus comprising:
   a processing device;
   and a memory coupled to the processing device, the memory storing instructions which, when executed by the processing device, cause the apparatus to:
   transmit a request to a destination site for allocation information indicating whether or not each of a plurality of regions of a destination logical storage device is allocated;
   determine whether or not each of a plurality of corresponding regions of a source logical storage device is allocated;
   receive the requested allocation information from the destination site;
   determine an allocation status of a first region of the plurality of regions of the source logical storage device and an allocation status of a corresponding first region of the plurality of regions of the destination logical storage device;

and optimizing a synchronization process between the first region or the source logical storage device and the corresponding first region of the destination logical storage device based upon the determined allocation status of the first region of the source logical storage device and the determined allocation status of the corresponding first region of the destination logical storage device including, when one of the first region of the source or the destination logical storage device is determined to be unallocated based on the determined allocation status, comparing a checksum generated for a corresponding other one of the first region of the source or destination logical storage device that is determined to be allocated based on the determined allocation status with against a predetermined checksum representing an unallocated region rather than reading and generating checksum for the first region of the source or the destination logical storage device that is determined to be unallocated.

20. The apparatus of claim 19, wherein optimizing the synchronization process between a second region of the source logical storage device and a corresponding second region of the destination logical storage device includes designating the second region of the source logical storage device and the corresponding second region of the destination logical storage device as being synchronized in response to a determination that both second regions are unallocated.

\* \* \* \* \*